(12) United States Patent
Fischer et al.

(10) Patent No.: US 9,280,567 B2
(45) Date of Patent: Mar. 8, 2016

(54) TECHNIQUE FOR STRUCTURING A NAVIGATION DATABASE

(71) Applicant: Elektrobit Automotive GmbH, Erlangen (DE)

(72) Inventors: Sebastian Fischer, Erlangen (DE); Holger Dormann, Nuremberg (DE)

(73) Assignee: Elektrobit Automotive GmbH, Erlangen (DE)

( * ) Notice: Subject to any disclaimer, the term of this patent is extended or adjusted under 35 U.S.C. 154(b) by 297 days.

(21) Appl. No.: 13/669,585

(22) Filed: Nov. 6, 2012

(65) Prior Publication Data

US 2013/0117321 A1 May 9, 2013

(30) Foreign Application Priority Data

Nov. 7, 2011 (EP) .................................. 11 008 835

(51) Int. Cl.
*G06N 5/00* (2006.01)
*G06F 1/00* (2006.01)
*G06F 17/30* (2006.01)
*G01C 21/32* (2006.01)

(52) U.S. Cl.
CPC .......... *G06F 17/30289* (2013.01); *G01C 21/32* (2013.01)

(58) Field of Classification Search
CPC ............ G06N 5/04; G06N 5/02; G06N 7/005
See application file for complete search history.

(56) References Cited

U.S. PATENT DOCUMENTS

| 5,919,245 A | 7/1999 | Nomura |
| 2004/0085227 A1 | 5/2004 | Mikuriya et al. |
| 2010/0262359 A1 | 10/2010 | Motoyama |
| 2010/0329508 A1* | 12/2010 | Chen et al. ..................... 382/103 |
| 2012/0209818 A1* | 8/2012 | Richter et al. ................. 707/690 |

FOREIGN PATENT DOCUMENTS

| EP | 0 953 954 A1 | 11/1999 |
| JP | 11174954 A | 7/1999 |
| JP | 2004177364 A | 6/2004 |
| JP | 2007101865 A | 4/2007 |
| JP | 2007248580 A | 9/2007 |
| JP | 2007292988 A | 11/2007 |
| WO | 2008/108449 A2 | 9/2008 |

OTHER PUBLICATIONS

European Search Report completed Jun. 27, 2012 in corresponding application No. EP 11 00 8835.
JP Office Action mailed Mar. 4, 2014 in corresponding JP Patent Application No. 2012-244408.

* cited by examiner

*Primary Examiner* — Jeffrey A Gaffin
*Assistant Examiner* — Kalpana Bharadwaj
(74) *Attorney, Agent, or Firm* — Carter, DeLuca, Farrell & Schmidt, LLP (57) ABSTRACT

A technique of structuring a navigation database is provided, wherein the navigation database includes at least route link data for a predetermined geographic area. A method implementation of the technique includes organizing route link data associated with the predetermined geographic area into at least one routing cluster; providing the at least one routing cluster with a cluster identifier; and storing the at least one routing cluster together with the cluster identifier in the navigation database.

17 Claims, 6 Drawing Sheets

TECHNIQUE FOR STRUCTURING A NAVIGATION DATABASE

TECHNICAL FIELD

The present disclosure generally relates to navigation database. In particular, the disclosure relates to a technique of structuring data in a navigation database.

BACKGROUND

State of the art navigation devices provide users with a large amount of useful information and search options regarding routes to be traveled, Point Of Interests (POIs), in the vicinity of calculated routes or in the vicinity of a device position, names of cities, streets or buildings, traffic information and so on. Depending on the services the navigation system is going to provide, navigation devices have stored in their databases large amounts of navigation data associated with, for instance, routing, map displaying, destination entry, POIs, traffic information.

When calculating a route on basis of user inputs and stored navigation data, a routing algorithm must be able to address all possible route links in the navigation database being used for route calculation and to hold the calculated route in a main memory of the navigation device. Thus, in order to get access to particular navigation data from the large amount of stored navigation data an addressing scheme is required. In general, the used addressing scheme is closely related with the data structuring in the database.

State of the art navigation databases (for instance, navigation databases compliant with Navigation Data Standard (NDS) storage format) use a global tiling scheme for navigation data addressing. The data structure and addressing scheme according to NDS will be described with reference to FIGS. 1 and 2 in more detail.

Figure 1A:
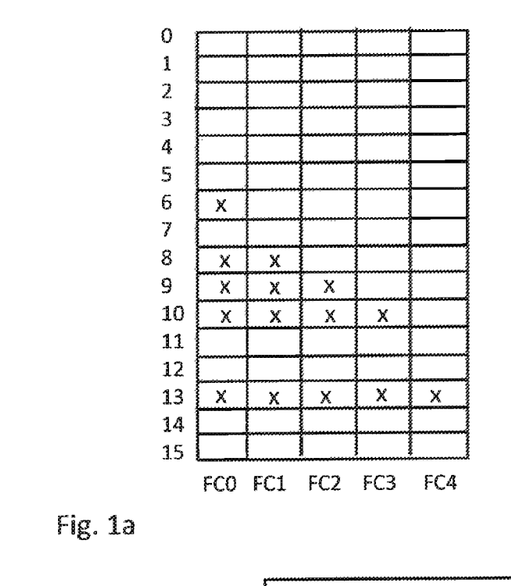
FIGS. 1a-1c schematically illustrate a navigation database structuring according to the prior art.

As illustrated in FIG. 1a, NDS provides 16 data levels (cf. x-axis in FIG. 1a: the highest data level is labeled Level 0, the lowest data level is labeled Level 15) for routing data. Specific data levels are assigned to routing data representing roads of specific road functional classes (FC) (i.e., FC1 to FC4 roads in accordance with the international classification standard for roads). In this context, NDS defines Level 13 as base level comprising routing data of FC0 to FC4 roads. Level 13 thus comprises the entire road network from highways to local small roads and, therefore, the highest road network resolution. As further illustrated in FIG. 1a, the road network resolution continuously decreases with decreasing level number. For instance, data levels 10, 9, 8 and 6 are merely associated with FC0 to FC3 roads, FC0 to FC2 roads, FC0 to FC1 roads (corresponding to a road network merely consisting of highways) and FC0 roads, respectively (cf. crosses in FIG. 1a). For clarity reasons, it should be noted that not all levels supported by NDS need to be available in a database. In the embodiment shown in FIG. 1a only Levels 6, 8, 9 10, and 13 are associated with routing data.

Each NDS level has its own underlying global tiling structure. A tile represents a rectangular territorial section in the global coordinate system having a predetermined size. The tile structure for each level is derived from a global tiling scheme that will be briefly discussed by referring to FIG. 2a. For Level 0 the surface of the earth is partitioned into two tiles, one tile covering the earth surface from 0° to +180° line of longitude (tile 1 in FIG. 2) and one tile covering the earth surface from 0° to −180° line of longitude (tile 2 in FIG. 2). For the subsequent Level 1, the two tiles are each split up into four tiles (only shown for tile 2 in FIG. 2). Each tile of Level 1 is split up again into four tiles (cf. hatched area) for Level 2 and so on. This hierarchical splitting scheme is continued through all levels down to the base level. More generally, for level k, with k=0, 1, 2, . . . 15, $2^{(2k+1)}$ tiles are generated. While Level 0 comprises only two tiles covering the whole surface of the earth, $2^{27}$ tiles are provided for structuring base Level 13, in which each tile covers a rectangular territorial section of approximately 2.5 km×2.5 km.

Figure 1B:
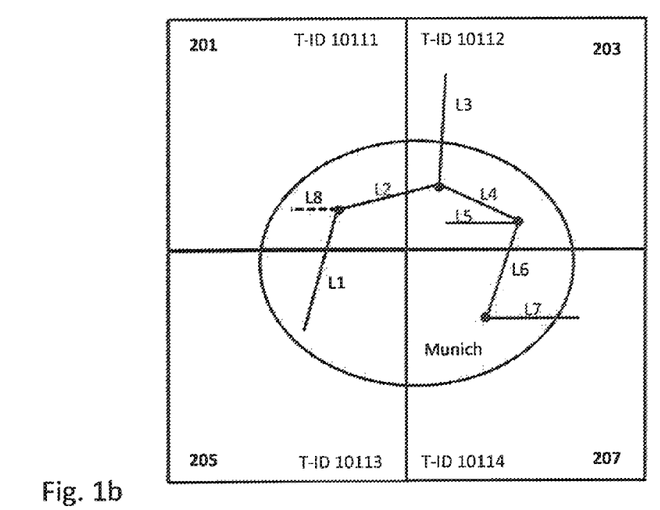
Figure 1C:
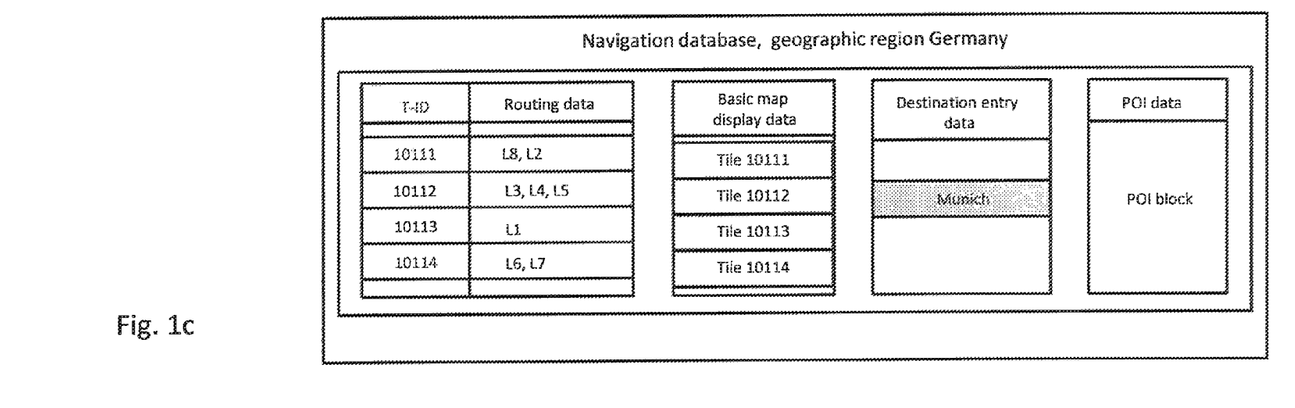

The NDS sub-structuring of NDS data levels is exemplarily illustrated for NDS level 9 in FIGS. 1b and 1c. FIG. 1b shows four tiles 201, 203, 205, 207 covering a local territorial section around the city "Munich" (cf. elliptical shadowed area). Further, route links L1 to L8 represent some roads of the city road network which are organized in the corresponding navigation database (cf. navigation database comprising the geographic region Germany in FIG. 1c) as follows. Route links L2, L8 of tile 201 (cf. FIG. 1b) are stored in a tile block with tile identifier T-ID 10111, route links L3, L4 and L5 in another tile block with T-ID 10112, route link L1 in a tile block with T-ID 10113 and route links L6, L7 in tile block with T-ID 10114 (please note that NDS stores route links extending over tile boundaries in the tiles in which the route links have their starting point). Similarly, also basic map display data may be organized in accordance with the underlying tile structure.

NDS uses the global T-ID in order to address individual route links within a tile. The structure of the T-ID is closely connected with the coding of the Geographic coordinate system used in NDS and illustrated in FIGS. 2a and 2b.

Figure 2A:
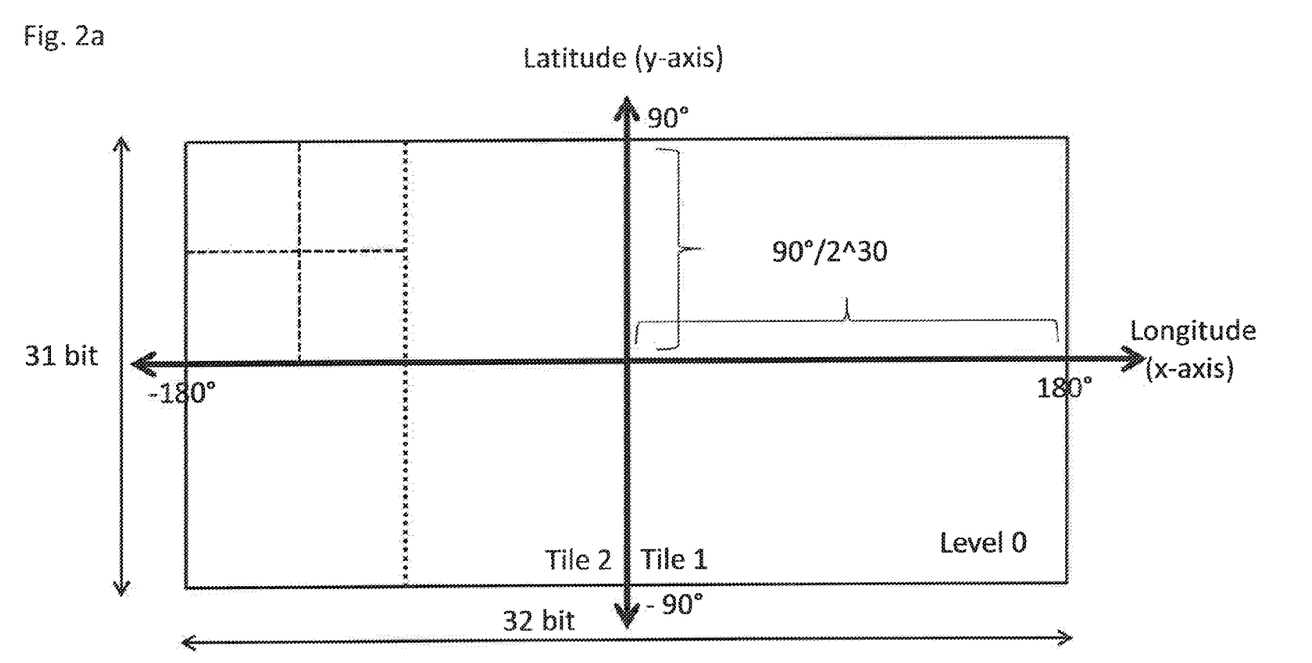
FIGS. 2a-2b schematically illustrate an addressing scheme according to the prior art.
Figure 2B:
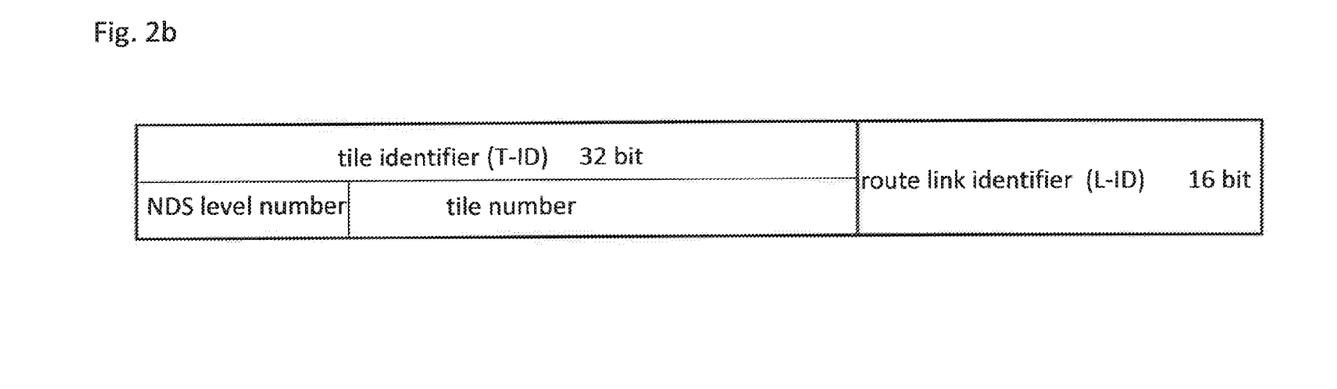

The longitude and latitude coordinates (x- and y-coordinates) are represented by 32 bit and 31 bit integers, respectively. Thus, an NDS coordinate unit corresponds to $90/2^{30}$ degrees (note scaling factor $2^{30}$) of longitude and latitude. The longitude and latitude integer values are further mapped to a single integer value using Morton mapping. The received Morton code represents a 63 bit integer received form a bit interleaving of the 32 bit and 31 bit integers for longitude and latitude. On the other hand, the Geographic coordinate system is partitioned for level k into $2^{(2k+1)}$ tiles. A tile number of a given tile in level k can be deduced from the most significant 2k+1 bits of the Morton code of a coordinate lying within that tile. Therefore, 2k+1 bits are required in order to unambiguously address a single tile within level k. Consequently, at least 27 bits are required for addressing Level 13 tiles.

In order to further differentiate between tiles of different levels, additional addressing bits are required. As shown in FIG. 2b, each T-ID in NDS is composed of a level number and the tile number. For a navigation database having a level and tile structure as shown in FIGS. 1a-1c a 32 bit ID is necessary for unambiguously addressing each tile of an arbitrary level. Further, NDS suggests a 16 bit route link identifier (L-ID) for addressing route links within each tile. Such a memory-consuming L-ID is necessary in order to address all possible route links within each specific tile, since NDS does not distinguish between tiles having high and low density of route links (for instance, tiles covering large cities may comprise large number of route links, whereas tiles covering mountains (e.g., Himalaya) or oceans may comprise a few route links (e.g., links representing ferry connections) or may be void). In sum, a memory-consuming 48 bit ID is required in order to address a single route link in NDS.

SUMMARY

It is an object to provide a more flexible database structure for efficiently addressing navigation data.

According to one aspect, a method of structuring a navigation database is provided, wherein the navigation database comprises at least route link data for a predetermined geographic area, the method comprising the steps of: organizing route link data associated with the predetermined geographic area into at least one routing cluster; providing the at least one routing cluster with a cluster identifier; and storing the at least one routing cluster together with the cluster identifier in the navigation database.

The "predetermined geographic area" may correspond to any (individual) geographic area provided by map or navigation data suppliers. It may comprise smaller or larger areas geographically and/or politically belonging together. For instance, (federal) states, countries, group of countries and/or single continents or portions thereof, such as North America, Middle East, South Europe, West Russia and so on may be meant.

The technique presented herein may be implemented in an NDS context (as described in the background section) or in the context of any other proprietary or general navigation data and/or map standard. It will thus be appreciated that when NDS specific expressions are used herein, the expressions are not be construed as being limited to NDS entities but also encompass corresponding entities of any other standard.

The method may further comprise providing the navigation database with at least one index structure for addressing the at least one routing cluster. The at least one index structure may be provided as index tree (optionally as B-tree B+-tree). The at least one index structure may comprise the cluster identifiers. Via the at least one index structure each routing cluster and/or route link of the database may be accessed.

The predetermined geographic area may be further partitioned into tiles. A tile may represent a local territorial section of the predetermined geographic area. In other words, tiles may represent local territorial sections of predetermined size and predetermined shape (for instance, rectangular area of 40 km×40 km) that are designed to cover the whole predetermined geographic area without gaps. Shape and size may depend on a tiling scheme used for partitioning. It is conceivable that a similar tiling scheme may be used as in NDS.

According to another realization, the above-mentioned NDS tiling scheme may be used in order to partition a predetermined geographic area (and in order to partition navigation data of the navigation database associated with the predetermined geographic area). According to still another realization, a local tiling scheme with local tile identifiers (local T-ID) may be used in order to partition a predetermined geographic area (and in order to partition navigation data of the navigation database associated with the predetermined geographic area).

Route links associated with a given tile (and optionally other navigation data of a corresponding tile, such as basic map display data, destination entry data, etc.) may be organized into at least one routing cluster. In other words, each tile covering the predetermined geographic area may be provided with distinct routing clusters.

The at least one index structure associated with the routing clusters may be organized independently from the tile structure. In other words, the index trees may be organized in accordance with the routing cluster structure and independently of the tiling structure within the database. The at least one index structure may (only) comprise the cluster identifiers (and, optionally, route link identifiers) via which each cluster can be referenced. The index structures associated with routing clusters may be independent from possible index structures associated with a possible database tile structure.

Hence, index structures for addressing the tiles may be independent from index structures addressing the clusters (and route links). Thus, the database may be provided with two different addressing schemes for tile addressing and route link addressing (or other navigation data addressing).

Each routing cluster may be provided with a flexible number of route links. However, each routing cluster may be provided with at least one route link. A routing cluster having void route links may not exist in the database. Each routing cluster may represent a database sub-structure comprising a flexible number of route links that is stored in a memory block. The route links within each cluster may be organized into a data table (i.e., route link table). The data table may be a relational table. In contrast thereto, a void tile having no route links (and/or other navigation data) may exist. Size and number of tiles may only depend on the tiling scheme applied for partitioning the underlying predetermined geographic area. A void tile may have no routing cluster.

The number of route links per cluster may not exceed a (given) upper threshold value. The upper threshold value may assume an arbitrary value. Small threshold values may be used in order to keep the possible maximum number of route links per cluster (i.e., the cluster size) low.

The number of stored routing clusters may be also flexible. The cluster number may depend on the amount of route link data of a database to be organized. It may depend on the entire number or route link density for the predetermined geographic area. Optionally, the cluster number may be limited by an upper threshold value. In case of tile partitioning, the number of created routing clusters per tile may depend on a route link density of the tiles. In other words, tiles with large numbers of route links may comprise a correspondingly larger number of routing clusters than tiles having a few route links. Thus, the number of routing clusters can be individually adjusted to the number of route links in each tile.

The number of created routing clusters may be proportional to the route link density. It is conceivable that generated clusters may be completely filled up with route links (in case the cluster size is limited by an upper threshold value) and new clusters are only created when the generated clusters are fully filled up. Alternatively, generated clusters may only be partially filled up with route link data.

The method may further comprise the steps of re-organizing route link data organized in at least one routing cluster into at least one new routing cluster, and storing the at least one new routing cluster in the database. The new routing cluster may further be provided with a cluster identifier. Route link data re-organization may be performed during database updating. It may comprise organizing route link data newly added to the database during update into new routing clusters and/or into existing routing clusters. It may also comprise assigning existing route links within existing routing clusters to other existing or newly generated cluster(s). The at least one index structure may be appropriately adjusted to the new cluster configuration. Hence, the re-organization may provide an efficient route link organization within the database.

The navigation data update may comprise a navigation data update of the whole database or an update of navigation data associated with one or several tiles (incremental update). For a "tiled database" an incremental update may be performed on basis of single tile updates. In such a case, route link data and routing clusters associated with a tile to be updated may be re-organized as described above.

The at least one routing cluster may be provided with an identifier (cluster identifier). The identifier may be a permanent identifier. Permanent identifier may mean that the identifier remains invariant during (incremental) database update. New clusters may be provided with new cluster identifiers. The permanent identifiers may ensure that routing clusters and/or route links remain accessible after an incremental database update without requiring updating the entire index structures.

Each route link within the at least one routing cluster may be provided with a link identifier. The link identifier may be a variable link identifier. The link identifier may correspond to the link number indicative of the order of the route links within the link table. "Variable link identifier" may mean that the route link order may change with route link re-organization as described above.

A size of the route link identifier (i.e. the bit number size) may be determined by the upper threshold value indicative of the maximum number of route links organizable within a cluster. The size of the route link identifier may determine the cluster size. The upper threshold value, and therefore, the bit size of the route link identifier may be kept small in order to keep the route link addressing space small. In other words, the bit number size of the route link identifier may assume a predetermined (small) value. A low bit number route link identifier may be especially advantageous in a "tiled database". Route links of tiles having only small numbers of route links can be easily organized and addressed within one or a few addressable routing clusters, whereas large numbers of route links may be organized and addressed by simply increasing the number of routing clusters per tile. Thus, the number of addressable routing clusters can be (dynamically) adjusted to the amount of route links (or navigation data in general) to be addressed.

The bit number size of the cluster identifier may be chosen such that each created routing cluster can be individually addressed via its assigned cluster identifier. The size of the cluster identifier may be adjusted to the size of the route link identifier. In case the bit number size of the route link identifiers is small the size of the cluster identifiers may be increased (since more clusters have to be generated and addressed) and vice versa. Within an addressing scheme providing a predetermined bit number size for navigation data addressing, the cluster identifier may be obtained from the difference between the predetermined bit number size for navigation data addressing and the (chosen) route link identifier size.

Each route link in the navigation database may be accessed by addressing the corresponding cluster identifier in which the route link may be organized and the corresponding route link identifier. Routing clusters and/or route links within the clusters can be directly addressed by the corresponding index structures. Thus, routing data can be addressed independently of the fixed tile structure.

The navigation database may further comprise at least one of map display data, destination entry data, POI data, TMC data and other enhanced navigation data. At least one of map display data, destination entry data, POI data, TMC data and other enhanced navigation data may be organized into variable navigation data clusters. Enhanced navigation data may be, for instance, orthoimage data, 3D data, speech data, full text search data, digital terrain model data and so on.

Provided is also a computer program product with program code for carrying out the structuring technique described herein when the computer program product is executed on a computer device. For this purpose, the computer program product may be stored on a computer-readable recording medium (e.g., a memory card or a read-only memory).

Provided is also a navigation database, the navigation database comprising at least route link data for a predetermined geographic area, wherein for the predetermined geographic area the navigation database comprises at least one routing cluster with cluster identifier for organizing the route link data.

The navigation database may further comprise at least one index structure comprising the cluster identifiers via which the at least one routing cluster and/or route links within the at least one routing cluster are accessible. The cluster identifiers may be permanent identifiers which remain unchanged during (incremental) data update(s).

The at least one routing cluster may be a flexible routing cluster comprising a variable number of route links. The routing clusters within the at least one routing cluster may be organized into (relational) route link tables. Each route link within the table may be provided with a route link identifier. The route link identifier may correspond to the route link order number within the route link table. The route link order may be variable. In other words, the route link order may change after an (incremental) update.

The cluster size may be variable. The cluster size may be given by the number of route links organized within the cluster. The maximum number of route links per cluster may not exceed an upper threshold value. The threshold value may be chosen such that a corresponding memory saving route link identifier can be used.

The navigation database may be further partitioned into tiles. Route links (and, optionally, other navigation data) associated with single tiles may be organized into clusters.

Provided is further a navigation device comprising the navigation database in accordance with the navigation database described above.

BRIEF DESCRIPTION OF THE DRAWINGS

Further details, advantages and aspects of the present disclosure described herein are given by the following drawings, wherein.

DETAILED DESCRIPTION

In the following description, for purposes of explanation and not limitation, specific details are set forth, such as specific navigation database structures and specific signaling scenarios, in order to provide a detailed understanding of the present disclosure. It will be apparent to one skilled in the art that the technique presented herein may be practiced in other embodiments that depart from these specific details. For example, the method, steps and functions explained herein can be easily implemented in the NDS database standard. A skilled person would easily recognize that the explained methods, steps and functions do not depend on the data level structure or special level-dependent tile design of NDS. The explained methods, steps and functions may be also applied in the context of other navigation data or map data standards.

Those skilled in the art will further appreciate that the methods, steps and functions explained herein may be implemented using individual hardware circuitry, using software functioning conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be apparent that the methods, steps and functions disclosed herein may be embodied in a processor and a memory coupled to the processor, wherein the memory stores one or more programs that control the processor to perform the steps discussed herein when executed by the processor.

The principles of an exemplary embodiment of the present disclosure will be described in more detail with reference to FIGS. 3 to 5.

Figure 3:
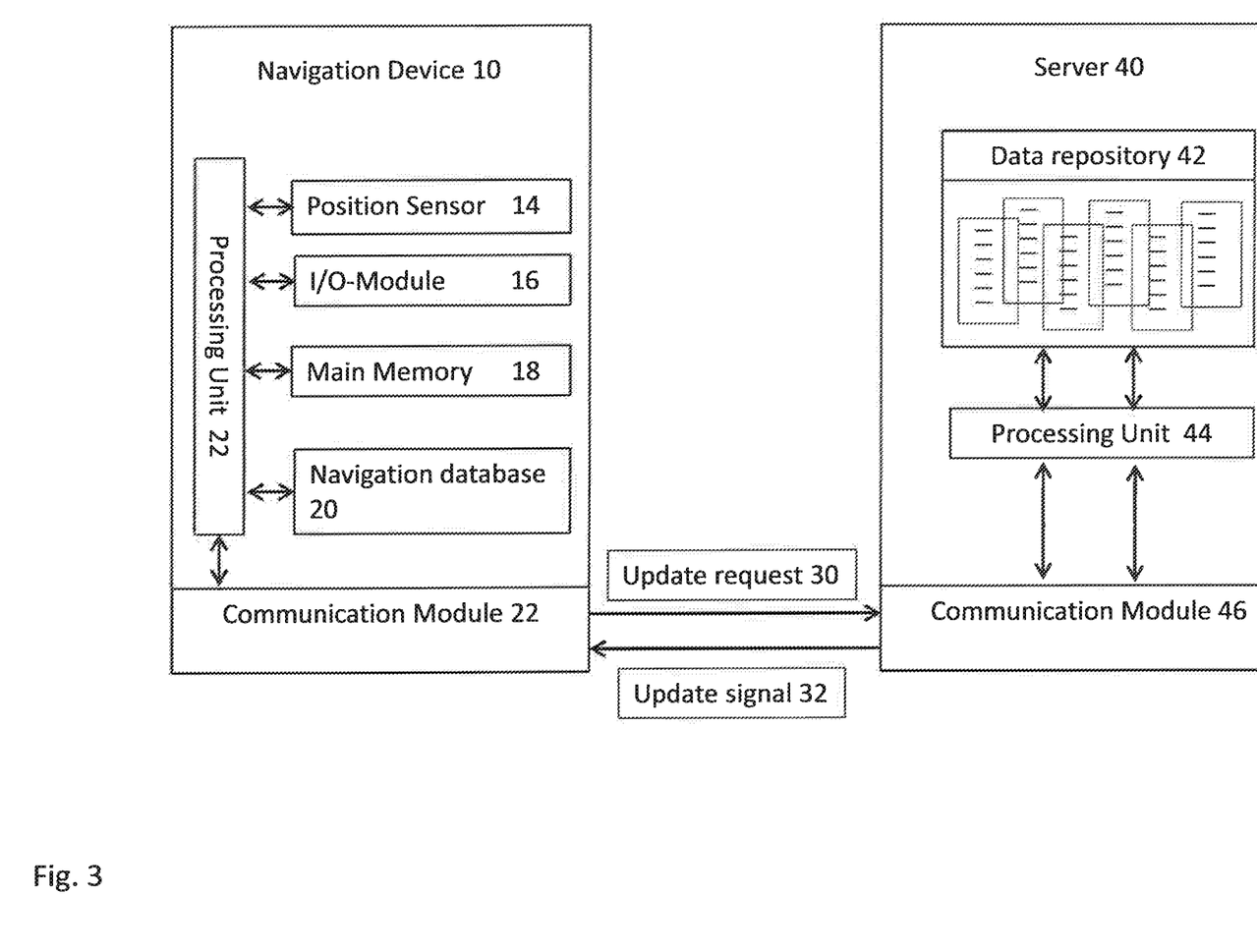
FIG. 3 schematically illustrates a navigation device according to one embodiment of the present invention.

FIG. 3 shows an embodiment of a navigation device 10 being in communication with a server 40. The navigation device 10 comprises a navigation database 20, which navigation data are structured in accordance with the present disclosure. The structuring of the database and addressing of the navigation data will be described in more detail below with reference to FIGS. 4, 5 and 6. The device 10 further comprises a processing unit 12, a position sensor 14, an input/output (I/O-) module 16, a main memory 18, as well as a communication module 22.

The position sensor 14 is configured to receive position coordinates from a positioning system, such as the Global Positioning System (GPS), Galileo or other systems. The I/O-module 16 represents an interface between navigation device 10 on the one hand and the user on the other hand. It may comprise optic and/or acoustic means for outputting calculated or searched navigation information (for instance, optic and/or acoustic output of calculated routes). The main memory 18 is configured to buffer input data, data received over the communication module 22 and/or navigation data loaded from the database 20 for further processing by the processing unit 12. The processing unit 12 is configured to coordinate and process data received from the communication module (for instance, update data), data to be transmitted via the communication module (for instance, update request), data of the position sensor 14, of the I/O-module 16 and/or the navigation database 20 (arrows in FIG. 3) in accordance with programs or (sub-) routines pre-stored in the navigation device 10.

The communication module 22 is configured to support wireless and/or wired communication with external devices, such as the navigation server 40 and/or other navigation devices, user terminals (smart phones, PDA, etc.). The communication module may comprise at least one radio module (not shown in FIG. 3) for supporting at least one of UMTS and GPRS communication.

The server 40 is configured to provide navigation data to the navigation device. The server comprises a data repository 42, a processing unit 44 as well as a communication module 46.

The database repository 42 is configured to store at least latest version navigation data related to individual states, countries, continents or other geographic regions. The repository may also store previous version navigation data. The navigation data may comprise at least one of routing data, map display data, destination entry data, Point Of Interest, POI, data, TMC data and other enhanced navigation data. The data may be stored in a modular way. For instance, at least one of routing data, destination entry data, map display data, POI data, TMC data and the other enhanced navigation data may be each stored in form of data clusters. It is also conceivable that the clusters may be associated with tiles in order to support incremental data update of tile-structured navigation databases. In addition, the repository 42 may comprise version data indicative of the navigation content versions. The navigation data may further comprise index structures configured for accessing single navigation data (i.e. route link clusters, map display clusters, etc.).

The server 40 may be further configured to perform the navigation data structuring as will be described in more detail in conjunction with FIG. 4 below. For this purpose, the server may comprise at least one program (stored on a server memory (not shown in FIG. 3)) that controls the processing unit 44 to perform the structuring steps discussed being below. The processing unit 44 may be further configured to control the data traffic from the communication module 46 to the data repository 42 and vice versa. In other words, the communication module may be configured to provide the navigation device with an update signal in response to an update request 30 received from the navigation device 10 via the communication module 46. Depending on the update request, the processing unit 44 may provide an update signal 32 comprising updated navigation data structured in accordance with the data structure of the navigation database 20 as well as updated index data. The update signal 32 may comprise navigation data in form of data clusters. According to one embodiment, the data clusters may be associated with individual tiles. The data signal may comprise a full or incremental update (i.e., on basis of single tiles) of the navigation database 20.

Figure 4A:
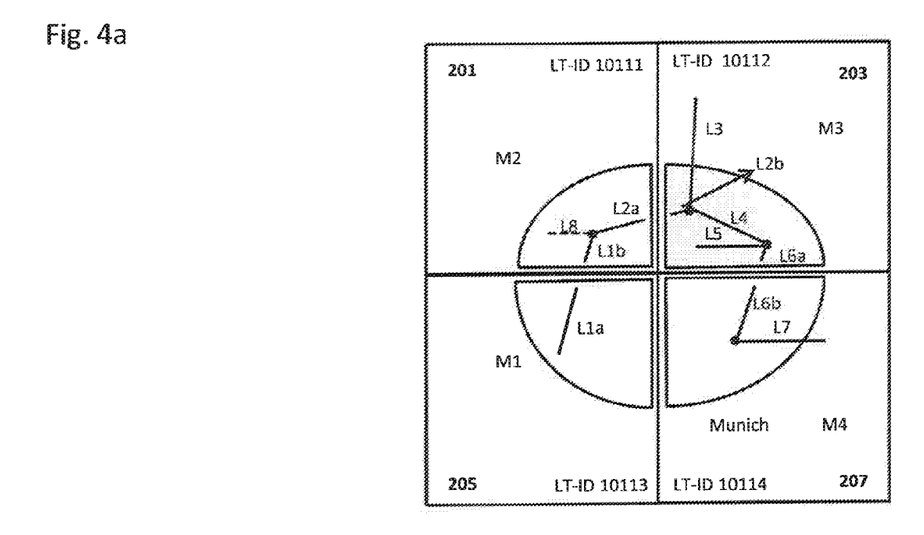
FIGS. 4a-4b schematically illustrate a navigation database structuring according to one embodiment of the present invention.
Figure 4B:
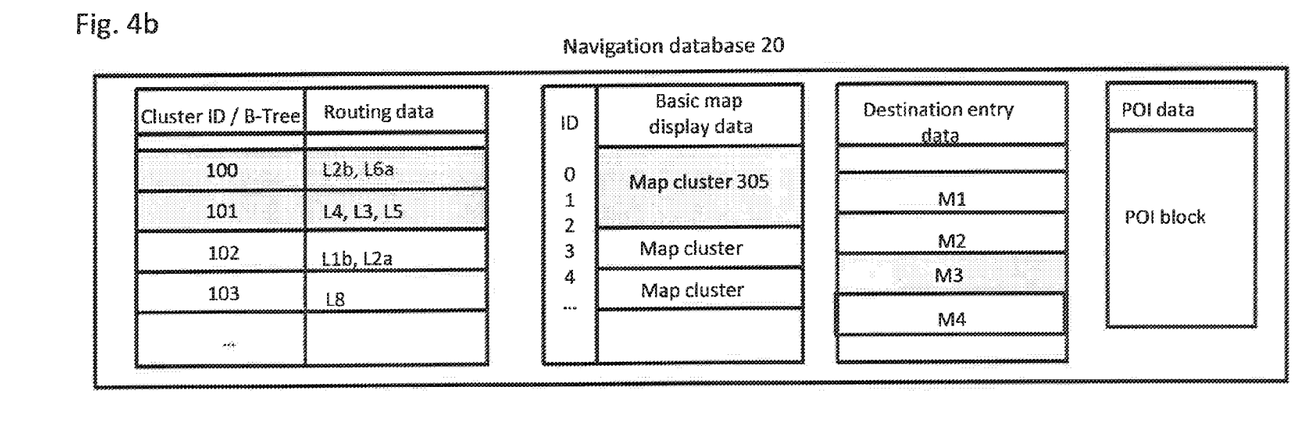
Figure 5:
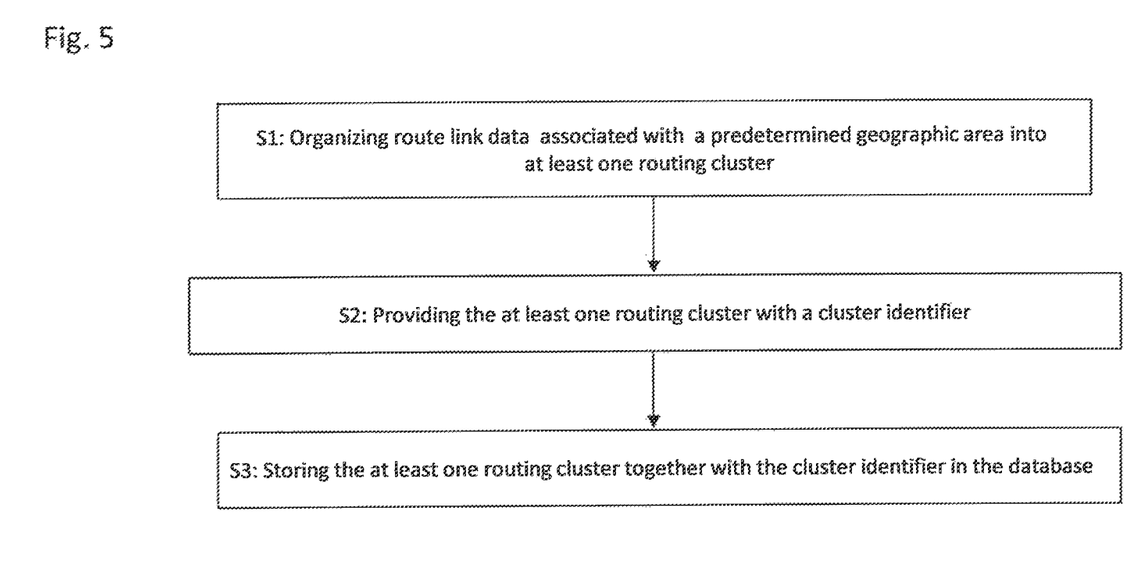
FIG. 5 illustrates a flow diagram of one method embodiment.
Figure 6A:
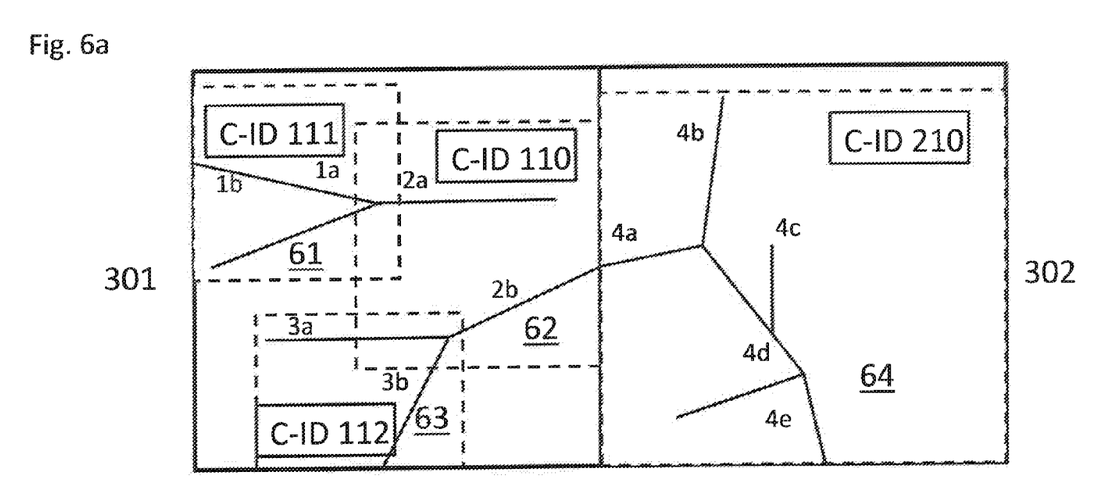
FIGS. 6a-6b schematically illustrate an addressing scheme according to one embodiment of the present invention.
Figure 6B:
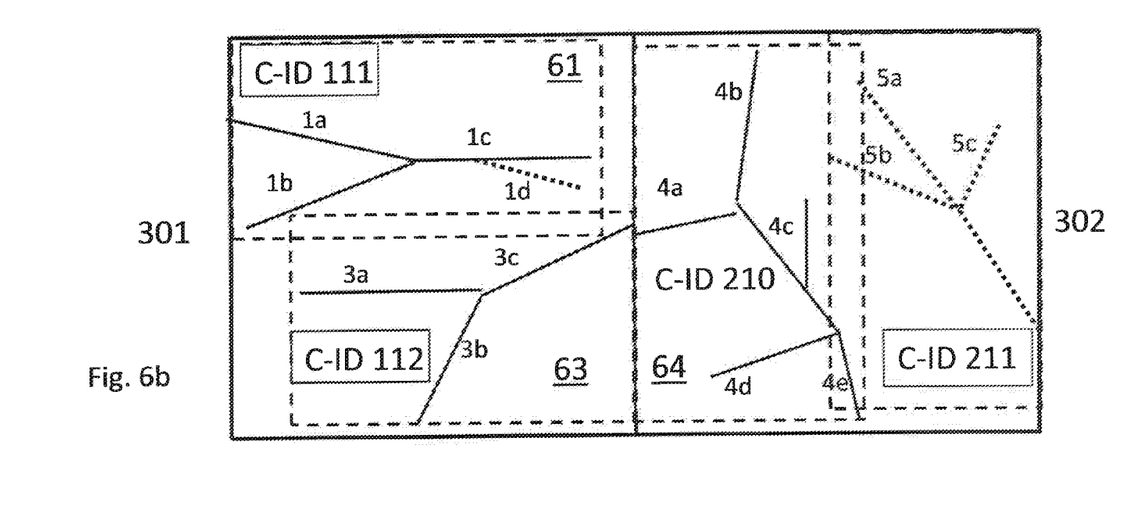

With reference to FIGS. 4 to 6 the structuring and addressing of the navigation database 20 comprising at least route link data for a predetermined geographic area is described in more detail. As already outlined above, it is conceivable that the navigation data structuring is performed by a navigation data supplier, such as the server 40 in FIG. 3. It is also possible that the navigation data structuring is performed by the navigation device 10, when the navigation device comprises corresponding pre-stored programs.

FIGS. 4a and 4b represent a schematic illustration of a database structuring according to one embodiment of the present disclosure. For clarity reason, FIG. 4a only represents route link data of a portion of a navigation database content associated with a larger predetermined area. For comparing reasons, the same geographic area around Munich as in FIG. 2a (and therefore, the same route link data) is illustrated. The geographic area portion is partitioned into tiles. In this context a local or global tiling scheme similar to the global tiling scheme used in NDS may be used. However, the present disclosure does not depend on details about the tiling of a predetermined area represented by the database content.

The database structure and structuring will be explained with reference to FIGS. 4b and 5.

In a first step, route link data of each tile of the predetermined geographic area are organized into at least one routing cluster. Further, each routing cluster is provided with a unique cluster identifier. For instance, as shown in FIG. 4b, route links L2b, L4, L3, L5, L6a of tile 203 are organized into two independent route link clusters with corresponding cluster identifiers (C-ID) C-ID 100 and C-ID 101. It is obvious that the C-ID values given in FIG. 4b are only exemplary values. The cluster identifier is usually given by a predetermined bit value and will be discussed in more detail below. In the same way, route links L1b, L2a and L8 are organized into two independent clusters with C-IDs 102 and 103. Although not shown in FIG. 4b, also the route links associated with tiles 205, 207 are each organized into at least one routing cluster. Consequently, a routing cluster represents a database sub-structure of the database 20 that is associated with a unique identifier. In a further step, the generated routing clusters and the corresponding provided cluster identifiers are stored in the navigation database 20.

The navigation database further comprises at least one index structure comprising the cluster identifiers. The at least one index structure is configured to provide a (direct) access to the routing clusters and/or route links of the routing clusters. For instance, B-trees may be used for cluster and/or route link referencing which leaf nodes comprise the routing cluster IDs. The index structures may be stored separately from the routing data (and, optionally, from other navigation data).

The navigation database 20 further comprises basic map display data, destination entry data and POI data. In the exemplary embodiment also the basic map display data and destination entry data are (for each tile) organized into data clusters. For instance tile 203 comprises a map display cluster 305 and a destination entry data cluster comprising map display data as well as Next Valid Character, NVC, data and Named Object data, respectively. Thus, as schematically illustrated by the partitioned portions M1, M2, M3, M4 in FIG. 4*a*, routing data, basic map display data and destination entry data are organized for each tile separately into at least one data cluster.

Of course, route link data, destination entry data and/or basic map display data may be also organized into clusters independently of the underlying tiling scheme. For instance, route links of several tiles may be organized into a single routing cluster. Further, POI data may be organized into POI clusters independently of the underlying tiling scheme. POI data associated with the predetermined geographic area may be organized according to POI classes. For instance, POI data indicative of restaurants may be organized into at least one POI cluster, wherein POI data indicative of pharmacies may be stored in at least one other POI cluster. The stored routing clusters (and other navigation data clusters) represent addressable data sub-structures that can be directly accessed (by a navigation application) via the corresponding index structures.

The underlying tile structure does not affect the navigation data addressing scheme and accessing. The tile structure may only be used for supporting incremental updates (i.e., substitution or updating of navigation data on single tile basis) in the navigation database 20.

With reference to FIG. 6 the structure of the routing clusters and associated therewith, an addressing scheme for route links is discussed. In the following, it will be assumed that the navigation database 20 has a tile structure for supporting incremental updates.

FIG. 6*a* shows two exemplary tiles 301, 302 of the navigation database 20 as well as route links representing a road network associated with both tiles 301, 302. The route links in tile 301 are further organized into three routing clusters 61, 62, 63, the routing clusters being associated with cluster identifiers (C-IDs) 110, 111, 112. In detail, cluster 61 comprises route links 1*a*, 1*b*, cluster 62 comprises route link 2*a* and 2*b* and cluster 63 comprises route links 3*a* and 3*b*. In a similar way cluster 64 of tile 302 comprises route links 4*a*-4*e*. Route links and/or routing clusters associated with both tiles 301, 302 are flexibly organized. While tile 302 only comprises few route links that can be easily organized within a single routing cluster, tile 301 comprises a larger number of route links that are organized into three routing clusters. It is evident that the present example is only used for explaining the principle of flexible route link clustering according to the present disclosure. The number of clusters and route links per cluster may vary from tile to tile and cluster to cluster, respectively.

The organization may be carried out in accordance with a route link organization scheme. For instance, it may be conceivable that route links representing roads or road portions traversing tile boundaries are clustered to a single cluster. It may be also possible that route links of specific road functional classes may be stored within a cluster. Independent of that organization details, each route link cluster is provided with an C-ID and each route link within a cluster is further provided with a route link identifier (L-ID). The L-ID may, for instance, be the position number of the route link within the cluster. Thus, each route link is addressable by the C-ID of the cluster to which the route belongs and the corresponding L-ID. For instance, a 24 bit C-ID may be used in order to address the routing clusters and an 8 bit L-ID may be used in order to address route links within each cluster. In such a case, $2^{24}$ cluster identifiers may be available, a sufficiently high number for addressing possible clusters within a navigation database. Further, $2^8$ route links can be addressed within each routing cluster. In sum, only 24 bit+8 bit are required for route link addressing rather than 48 bit as it is the case for NDS using the rigid global tiling scheme. Of course, C-ID and/or L-ID may assume other bit values depending on the amount of data of the database. However, since routing clusters are only generated for route link organization and the number of clusters scales with the cluster size (determined by the size of the provided L-ID), the number of clusters and therefore the size of the cluster identifier can be kept small resulting in a more efficient navigation data addressing.

FIG. 6*b* shows the tiles 301 and 302 after an (incremental) update. As shown, in both tiles 301, 302 new route links (1*d*, 5*a*-5*c*) have been added. According to the flexible clustering scheme, new roads can be organized into new clusters 65 (as shown for tile 302) or added to existing clusters (cluster 61, 63). Accordingly, cluster 61 may be re-organized and the route links 1*a*-1*c* of the cluster may be provided with new L-IDs. Further, due to changes in the road configuration, existing routing clusters can be modified (if appropriate). For instance, during the re-organization process cluster 62 have been deleted and the existing route links 2*a* and 2*b* of cluster 62 have been added to existing clusters 61 and 63 (links 1*c* and 3*c*, respectively). Thus for each tile, depending on the route link density and/or route link properties, clusters are dynamically generated, re-organized and/or deleted.

The advantage of such a flexible route link and cluster organization is that the number of clusters can be kept small. Accordingly, also the size of the cluster identifier can be lower dimensioned with respect to a rigid addressing scheme. Hence, a less memory consuming addressing scheme is provided for addressing navigation data.

While the technique presented herein has been described with respect to particular embodiments, those skilled in the art will recognize that the present invention is not limited to the specific embodiments described and illustrated herein. It is to be understood that this disclosure is only illustrative. Accordingly, it is intended that the invention be limited only by the scope of the claims appended hereto.

What is claimed is:

1. A method of structuring a navigation database, wherein the navigation database comprises at least route link data for a predetermined geographic area, comprising:
   organizing route link data associated with the predetermined geographic area into at least one routing cluster;
   providing the at least one routing cluster with a cluster identifier; and storing the at least one routing cluster together with the cluster identifier in the navigation database, wherein the predetermined geographic area is further partitioned into tiles, wherein the organizing step further comprises, for each tile, organizing route link data associated with the tile into at least one routing cluster, and wherein the at least one routing cluster is addressable by at least one index structure comprising the cluster identifier that is provided to the navigation database.

2. The method according to claim 1, wherein the at least one index structure associated with the routing clusters is organized independently from the tile structure.

3. The method according to claim 1, wherein each routing cluster is provided with at least one route link.

4. The method according to claim 1, wherein a number of route links organized within the at least one routing cluster does not exceed an upper threshold value.

5. The method according to claim 1, wherein a number of routing clusters depends on a route link density.

6. The method according to claim 1, further comprising:
re-organizing route link data organized in at least one routing cluster into at least one new routing cluster; and
storing the at least one new routing cluster in the database.

7. The method according to claim 6, wherein the at least one new routing cluster is provided with a cluster identifier.

8. The method according to claim 1, wherein each route link within the at least one routing cluster is provided with a route link identifier.

9. The method according to claim 8, wherein the size of the route link identifier is determined by the upper threshold value indicative of the maximum number of route links organizable within a cluster.

10. The method according to claim 1, wherein the navigation database further comprises at least one of map display data, destination entry data, POI data, TMC data and other enhanced navigation data.

11. The method according to claim 10, wherein the at least one of map display data, destination entry data, POI data, TMC data and other enhanced navigation data are organized into variable navigation data clusters.

12. A computer program product with program code for carrying out the method according to claim 1, when the computer program product is executed on a computer device.

13. The computer program product of claim 12, which is stored on a non-transitory computer-readable medium.

14. A navigation database comprising;
at least route link data for a predetermined geographic area, wherein the predetermined geographic area is partitioned into tiles, wherein for each tile the at least route link data associated with the tile are organized into at least one routing cluster with cluster identifier, and wherein the navigation database further comprises at least one index structure comprising the cluster identifier via which the at least one routing cluster is accessible.

15. The navigation database according to claim 14, wherein the at least one routing cluster is a flexible routing cluster comprising a variable number of route links.

16. The navigation database according to claim 14, wherein the cluster identifier is a permanent identifier.

17. A navigation device comprising the navigation database of claim 14.

* * * * *